United States Patent [19]

Iwata et al.

[11] Patent Number: 4,792,033
[45] Date of Patent: Dec. 20, 1988

[54] APPARATUS AND METHOD FOR SUPPLYING ARTICLES TO A CONVEYOR

[75] Inventors: Yasuo Iwata; Osamu Tokunaga; Hisasi Kuga, all of Chiba; Toshihide Kohata, Tokyo, all of Japan

[73] Assignees: Tokyo Automatic Machinery Works, Ltd.; Japan Tobacco Inc., both of Tokyo, Japan

[21] Appl. No.: 133,351

[22] Filed: Dec. 15, 1987

[30] Foreign Application Priority Data

Dec. 25, 1986 [JP] Japan .................................. 61-312565

[51] Int. Cl.[4] ............................................. B65G 43/00
[52] U.S. Cl. ................................. 198/357; 198/358; 198/370; 198/448
[58] Field of Search ........................... 198/356–358, 198/370, 444, 448–451

[56] References Cited

U.S. PATENT DOCUMENTS

| 1,867,717 | 7/1932 | Stebler | 198/357 |
|---|---|---|---|
| 3,040,862 | 6/1962 | Schmermund et al. | 198/448 |
| 3,223,225 | 12/1965 | Clark et al. | 198/357 |
| 3,279,581 | 10/1966 | Drennan | 198/358 |
| 4,129,205 | 12/1978 | Anderson et al. | 198/358 |
| 4,243,135 | 1/1981 | Heitmann | 198/370 |
| 4,551,040 | 11/1915 | Kasparek et al. | 198/444 |

Primary Examiner—Joseph E. Valenza
Attorney, Agent, or Firm—Sandler & Greenblum

[57] ABSTRACT

Articles are supplied to a conveyor by feeding primary articles from a primary supply, seriatim, to a conveyor. The conveyor is driven at a first speed consistent with the supply of primary articles so that primary articles are uniformly spaced on said conveyor. The presence of a predetermined number of supplemental articles in a supplemental supply is detected, and used to increase the speed of the conveyor to produce space on the conveyor sufficient to receive the predetermined number of supplemental articles. The predetermined number of supplemental articles are fed, seriatim, to the conveyor such that the supplemental articles are uniformly spaced on the conveyor with the same spacing that the primary articles on the conveyor.

14 Claims, 3 Drawing Sheets

APPARATUS AND METHOD FOR SUPPLYING ARTICLES TO A CONVEYOR

TECHNICAL FIELD

This invention relates to apparatus and method for supplying articles to a conveyor, and more particularly to apparatus and method for introducing supplemental articles into a conveyor line carrying primary articles.

BACKGROUND ART

Equipment for automatically packaging articles generally include sequential stations at which various assembly, packaging, and wrapping operations are effected, with automated inspection being carried out between stations. For example, in packaging cigarettes, the packages pass through a seal application station in which a sealing strip is applied across the top of each package before the package is conveyed to a wrapping station. For quality control purposes, inspection of each package is carried out between the station in which the seal strip is applied and the wrapping station in order to weed-out those packages with defective sealing strips. Where an automatic inspection process is employed, experience shows that some of the packages weeded out are actually satisfactory and can be returned to the main packaging line for wrapping. Furthermore, some defective packages can be reworked and returned to the packaging line.

Ideally, those packages weeded out during inspection and later found to be satisfactory or reworked could be collected into a supplemental supply and reinserted into the main line downstream of the inspection station and before the line reaches the next packaging station. That is to say, spaces between packages in the main packaging line created by the diversion of packages as a result of an inspection, could be filled with packages from the supplemental supply. This approach, however, requires the inspection process to be highly synchronized with the movement of the main line. Where, for one reason or another, many possibly defective packages are detected in a given time period, and diverted from the main line, the inspection process cannot be completed in time to place those later packages found to be acceptable back into the line before the packages reach the next station. When this situation occurs, space in the main line is provided by halting the upstream operation of the packaging line providing the primary packages, a procedure that reduces productivity and requires manual intercession into an otherwise automatic process.

It is therefore an object of the present invention to provide new and improved apparatus and method for introducing supplemental articles into a conveyor line carrying primary articles without stopping the line.

BRIEF DESCRIPTION OF INVENTION

A method according to the present invention for supplying articles to a conveyor includes the steps of supplying primary articles, seriatim, from a primary supply to a conveyor, and driving the conveyor at a first speed consistent with the supply of primary articles so that the latter are uniformly spaced on said conveyor. The presence of a predetermined number of supplemental articles in a supplemental supply is detected; and, the speed of the conveyor is increased in response to such detection, to produce space on the conveyor sufficient to receive the predetermined number of supplemental articles. At this point, the predetermined number of supplemental articles are supplied, seriatim, to the conveyor so that the supplemental articles are uniformly spaced on the conveyor with the same spacing as the primary articles on the conveyor.

In the preferred embodiment of the invention, the supply of primary articles is stopped in response to detection of the presence of the predetermined number of supplemental articles in the supplemental supply. After the predetermined number of supplemental articles are supplied to the conveyor, the speed of the conveyor is decreased to the first speed simultaneously with the resumption of the supply of primary articles to the conveyor. The present invention thus provides for the automatic introduction of supplemental articles into a conveyor line carrying primary articles without the need for manual intercession.

BRIEF DESCRIPTION OF DRAWINGS

An embodiment of the present invention is shown in the accompanying drawings wherein.

DETAILED DESCRIPTION

Figure 5:
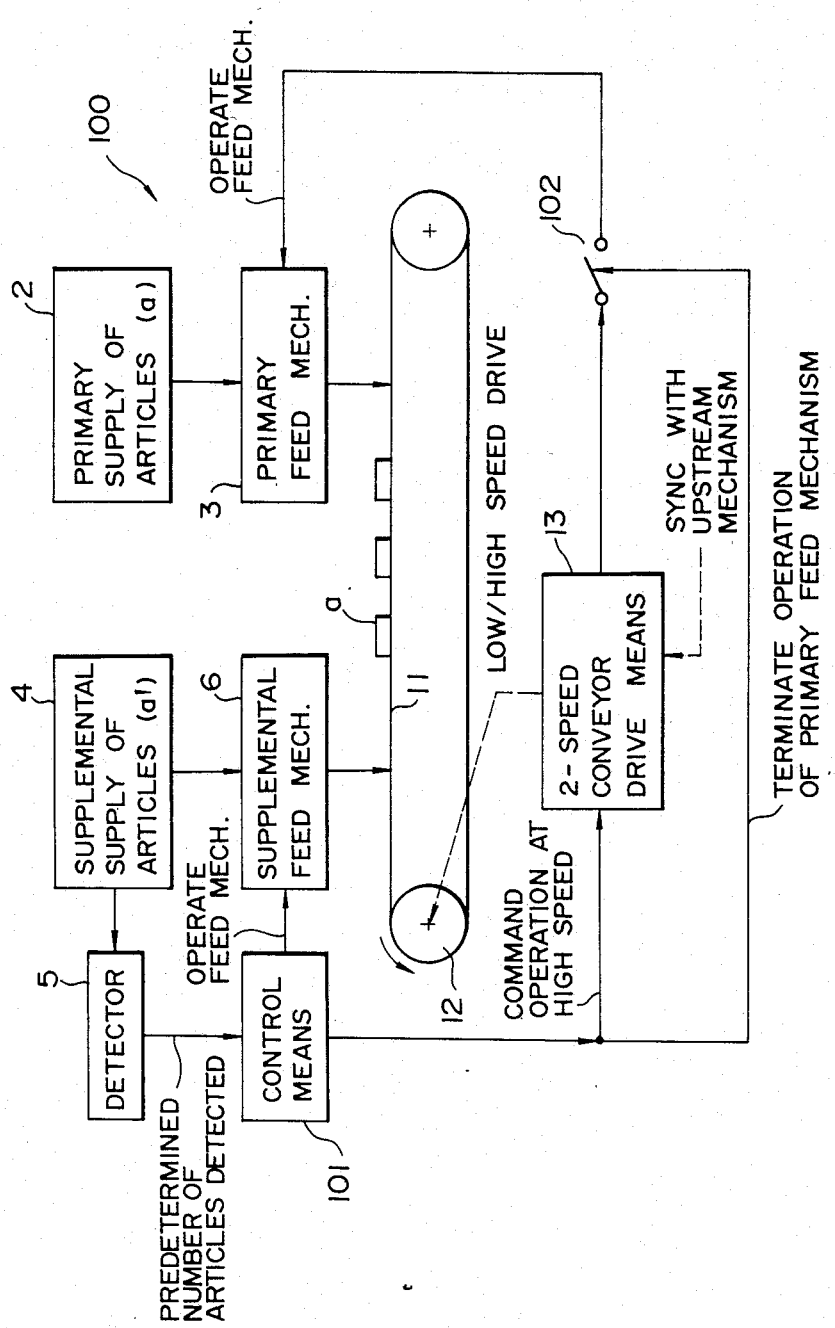
FIG. 5 is a block diagram schematically showing the operation of the present invention.

Before discussing the details of the present invention illustrated in FIGS. 1-4, reference is made to FIG. 5 for the purpose of providing an overview of the invention in order to better appreciate the interaction between various components of the invention, and to provide an understanding of its overall operation. As shown in FIG. 5, reference numeral 100 designates apparatus according to the present invention, such apparatus comprising conveyor 11 carried by drive roller 12 which is driven by drive means 13 at either a low speed or a high speed depending upon the state of control means 101. Primary articles a accumulated in supply 2 are fed by mechanism 3 onto conveyor 11 when mechanism 3 is operated by drive means 3. Schematically, the control of the operation of mechanism 3 by the drive means is illustrated by switch 102. That is to say, drive means 13 operates feed mechanism 3 only when switch 101 is closed, a condition of the switch that exists only when the drive means operates the conveyor at its low speed. In actual practice, switch 102 is constituted by an mechanical arrangement that couples a driving motion to mechanism 3 only when the conveyor is operated at low speed.

When detector 5 detects a predetermined number of supplemental articles a' in supply 4, the output of the detector causes control means 101 to effect three operations: (1) drive means 13 is commanded to increase the speed of the conveyor for a selected period of time; (2) the operation of feed mechanism 3 is interrupted (by opening switch 102) for such period of time; and (3) feed mechanism 6 is operated for such period of time. The interruption in the operation of feed mechanism 3 coupled with an increase in speed of the conveyor serves to create a space on the conveyor large enough to accept the predetermined number of supplemental articles a' fed to the conveyor by the operation of mechanism 6.

After the predetermined number of supplemental articles are fed to the conveyor, control means 101 effects the reversal of the three operations described above. That is to say, control means 101 interrupts operation of supplemental feed mechanism 6, commands drive means 13 to run the conveyor at its original speed, and resumes operation of feed mechanism 3. In this way, a predetermined number of supplemental articles are automatically inserted into a moving conveyor line of primary articles.

Figure 1:
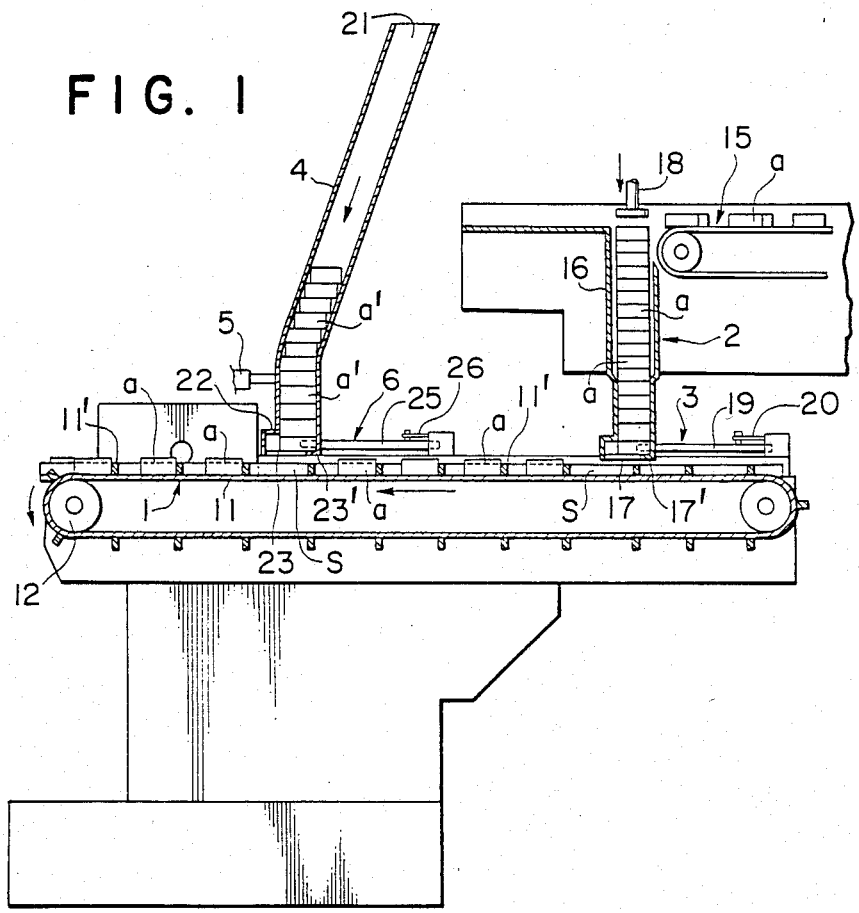
FIG. 1 is a side view showing the primary and supplemental feeding mechanisms associated with a packaging line.
Figure 2:
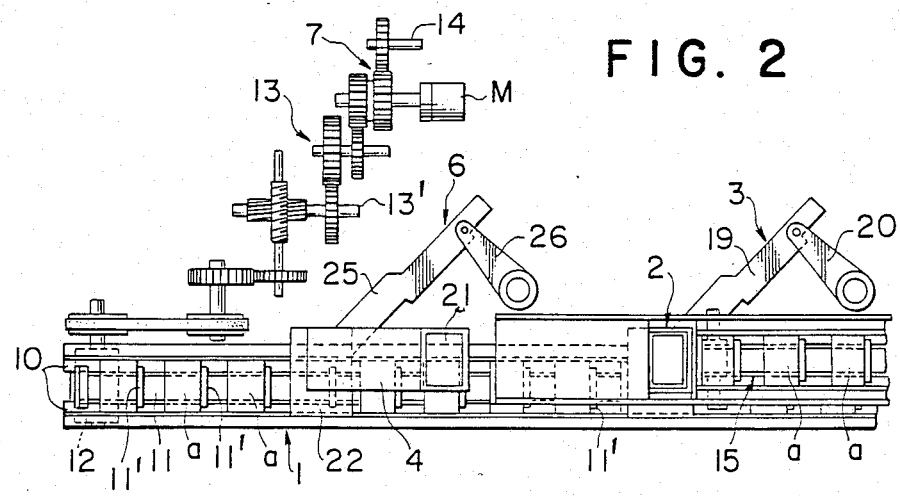
FIG. 2 is a top plan view of the apparatus shown in FIG. 1.
Figure 3:
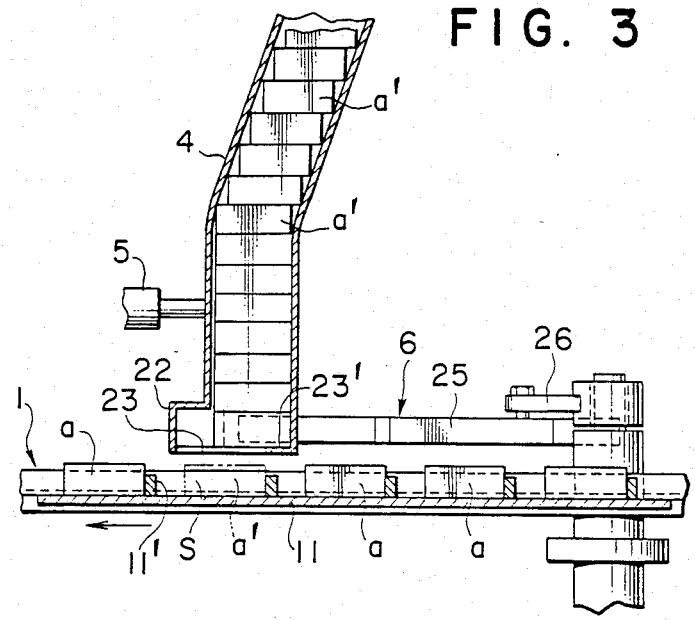
FIG. 3 is an enlarged view of the supplemental supply portion of the present invention.
Figure 4:
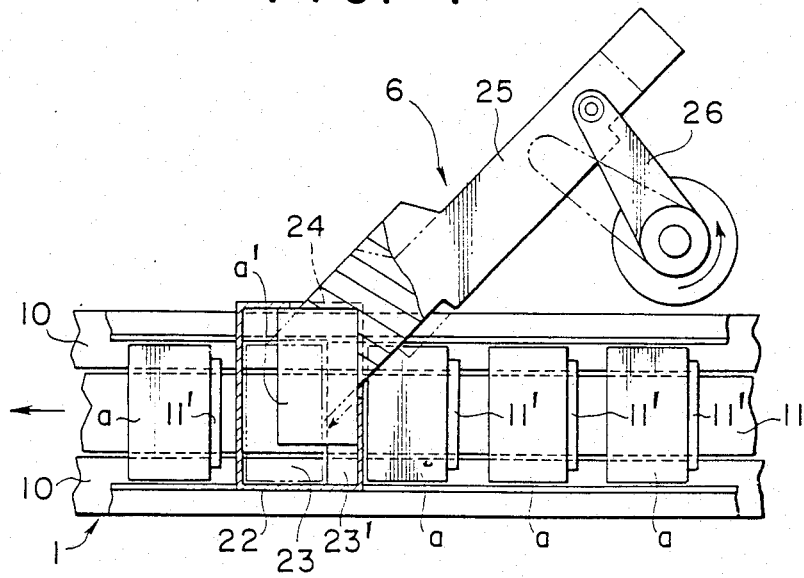
FIG. 4 is a top plan view of the apparatus shown in FIG. 3 with parts partially broken away to clarify the operation of the invention.

Referring now to FIG. 1, apparatus according to the present invention includes conveyor line 1 having spaced guides 10 supporting conveyor belt 11 which carries a plurality of transverse pusher bars 11' evenly spaced along the length of the conveyor. Belt 11 mounted on a pair of rollers, roller 12 constituting the drive for the conveyor which moves in the direction indicated by the arrows in FIG. 1. Drive roller 12 is connected through transmission mechanism 13 (FIG. 2) to drive shaft 14 whose rotation is synchronized with operation of an upstream packaging process which supplies packages a to conveyor 11.

As seen in FIG. 1, packages a are supplied from the upstream packaging operation by conveyor 15 which delivers the packages to magazine 16 of primary supply 2. Pusher 18 causes the packages to be stacked in the magazine which is in the form of a vertically oriented tube whose crosssection matches the cross-section of packages a. The bottom of the magazine is provide with stop-flange 17' for forming a ledge that supports the vertical stack of packages. Adjacent the bottom of the tube of magazine 16 is an opening in the side of the tube for receiving the free end of pusher arm 19 of feed mechanism 3. The other end of the pusher arm is pivotally connected to drive lever 20 which oscillates in accordance with the rotation of shaft 13' of transmission 13. That is to say, one revolution of shaft 13' is mechanically converted to one oscillation of lever 20 and thus one stroke of pusher arm 19. In addition, one revolution of shaft 13' results in the linear displacement of the conveyor through a distance equal to the spacing between adjacent pusher bars 11'.

The free end of pusher arm 19 passes through the opening in the bottom of the vertical tube of magazine 16 when lever 20 oscillates, and engages the lowermost package resting on stop-flange 17' moving this package out of engagement with the stop-flange and into alignment with opening 17 which constitutes a supply port through which the displaced package drops by gravity onto conveyor 11. The synchronized operation of drive lever 20 with the movement of conveyor 11 is such that primary feed mechanism 3 deposits a single package a onto conveyor 11 each time a pusher bar 11' passes magazine 16. In this manner, primary feed mechanism 3 is responsive to the operation of the conveyor at a first speed for feeding packages a, seriatim, from the primary supply to the conveyor so that the packages from this magazine are uniformly spaced on the conveyor.

Downstream from primary supply 2, is supplemental supply 4 constituted by a downwardly sloping tube 21 which acts as a magazine that receives and stores supplemental packages a' which may be packages extracted from conveyor 15 upstream of the apparatus shown in FIG. 5, inspected, and then made available for reinsertion into main line 1.

Tube 21 has, at its lower end, stop-flange 23' which forms a stop and engages packages a' permitting these packages to be stacked in the hopper. To one side of this hopper is pusher arm 25 to one of which is pivotally mounted drive lever 26. When drive lever 26 is oscillated as shown by the arrow in FIG. 4, the free end of the pusher arm enters opening 24 at the bottom of tube 21, engages package a' resting on flange 23', and displaces this package into alignment with opening 23 in the bottom on tube 21 thereby allowing the displaced package to drop by gravity onto conveyor 11.

Drive lever 26 is not oscillated, however, until after sensor 5 senses a predetermined number of supplemental packages a' in tube 21. In FIG. 1, sensor 5 is vertically located above flange 23' a distance equal to the height of five packages stacked in tube 21. This height is arbitrary, however, and could be made equal to the height of any number of packages.

When the predetermined number of packages is sensed by sensor 5, motor M (FIG. 2) is operated causing speed-change gears 7 of transmission mechanism 13 to speed-up the rotation of drive roller 12 thereby increasing the linear speed of conveyor 11. Simultaneously, the operation of drive lever 20 associated with primary feed mechanism 3 is disabled. In addition, the sensing of a predetermined number of supplemental packages in hopper 21 is accompanied by the initiation of oscillation of drive lever 26 of supplemental feed mechanism 6 which continues until five articles are fed from supply 4 to the conveyor.

As a consequence of the termination of the supply of primary articles by primary feed mechanism 3, and the speeding up of the rotation of drive wheel 12, spaces S develop in the conveyor to provide clearance in the form of spaces S into which supplemental packages a' are deposited.

In operation, packages produced by a previous packaging operation are supplied to conveyor 15 to hopper 16 of primary supply 2. The linear displacement of conveyor belt 11 is accompanied by the regular oscillation of drive lever 20 for the purpose of inserting primary articles a into receptacles defined by pusher plates 11' on the conveyor such that primary packages are delivered uniformly on the conveyor. Supplemental articles, as they are produced, are added to hopper 21. When the number of supplemental articles in hopper 21 reaches a predetermined number, this situation is sensed by sensor 5 which decouples transmission 13 from drive lever 20, and at the same time increases the linear speed of the conveyor. The resultant empty receptacles formed by pusher plates 11' are filled by the operation of drive lever 26 which commences in synchronism with the increase in linear speed of the conveyor and the termination of the operation of drive lever 20 of primary feed mechanism 3. In this manner, the predetermined number of supplemental packages a' are inserted into conveyor line 1.

The advantages and improved results furnished by the method and apparatus of the present invention are apparent from the foregoing description of the preferred embodiment of the invention. various changes and modifications may be made without departing from the spirit and scope of the invention as described in the claims that follow.

What is claimed is:

1. A method for supplying articles to a conveyor comprising the steps of:
   (a) feeding primary articles from a primary supply, seriatim, to a conveyor;
   (b) driving said conveyor at a first speed consistent with the rate at which primary articles are fed to the conveyor so that primary articles are uniformly spaced on said conveyor;
   (c) detecting the presence of a predetermined number of supply articles in a supplemental supply;
   (d) increasing the speed of said conveyor to produce space on said conveyor sufficient to receive said predetermined number of supplemental articles; and
   (e) feeding said predetermined number of supplemental articles, seriatim, to said conveyor so that said supplemental articles are uniformly spaced on the conveyor with the same spacing as the primary articles on the conveyor.

2. A method according to claim 1 comprising the steps of:
   (a) stopping the feeding of primary articles to said conveyor in response to detection of the presence of said predetermined number of supplemental articles in said supplemental supply; and
   (b) simultaneously decreasing the speed of said conveyor to said first speed after said predetermined number of supplemental articles are fed to said conveyor and resuming the feeding of primary articles to said conveyor.

3. Apparatus for supplying articles to a conveyor comprising:
   (a) a primary supply of primary articles, and a supplemental supply of supplemental articles;
   (b) a conveyor having conveyor drive means for driving the conveyor at a first speed, and at a second speed higher than the first speed;
   (c) a primary feed mechanism responsive to operation of said conveyor at said first speed for feeding primary articles, seriatim, from said primary supply to said conveyor so that primary articles are uniformly spaced on said conveyor;
   (d) detector means for detecting the presence of a predetermined number of supplemental articles in said supplemental supply;
   (e) control means responsive to detection of the presence of a predetermined number of supply articles in said supplemental supply for causing said conveyor and drive means to drive said conveyor at said second speed until there is sufficient space on said conveyor to accommodate said predetermined number of supplemental articles with the same spacing as the primary articles on the conveyor; and
   (f) a supplemental feed mechanism downstream of said primary feed mechanism and responsive to operation of said conveyor at said second speed for feeding supplemental articles, seriatim, from said supplemental supply to said conveyor so that the supplemental articles are uniformly spaced on the conveyor with the same spacing as the primary articles on the conveyor.

4. Apparatus according to claim 3 wherein said control means is constructed and arranged to halt operation of said primary feed mechanism in response to detection of the presence of said predetermined number of supplemental articles.

5. Apparatus according to claim 4 wherein said control means is constructed and arranged to effect resumption of operation of said primary feed mechanism after said predetermined number of supplemental articles are fed to said conveyor.

6. Apparatus according to claim 5 wherein said control means is constructed and arranged to terminate operation of said supplemental feed mechanism after said predetermined number of supplemental articles are fed to said conveyor.

7. Apparatus according to claim 3 wherein said control means is constructed and arranged to cause said conveyor drive means to drive the conveyor at said first speed after there is sufficient space on said conveyor to accommodate said predetermined number of supplemental articles.

8. Apparatus according to claim 7 wherein said control means is constructed and arranged to halt operation of said primary feed mechanism in response to detection of the presence of said predetermined number of supplemental articles.

9. Apparatus according to claim 8 wherein said control means is constructed and arranged to effect resumption of operation of said primary feed mechanism after said predetermined number of supplemental articles are fed to said conveyor.

10. Apparatus according to claim 9 wherein said control means is constructed and arranged to terminate operation of said supplemental feed mechanism after said predetermined number of supplemental articles are fed to said conveyor.

11. Apparatus according to claim 3 wherein said conveyor includes a plurality of empty receptacles each of which is configured to receive an article, operation of said primary feed mechanism being synchronized with operation of said conveyor drive means such that successive empty receptacles on said conveyor are filled with primary articles when said conveyor is driven at said first speed.

12. Apparatus according to claim 11 wherein said control means causes said conveyor operating means to operate the conveyor at said second speed until, downstream of said primary feed mechanism, the number of empty receptacles equals said predetermined number, and wherein operation of said supplemental feed mechanism is synchronized with operation of said conveyor drive means such that succeeding empty receptacles on said conveyor are filled with supplemental articles when said conveyor is driven at said second speed.

13. Apparatus according to claim 3 wherein said primary feed mechanism includes a vertical tube for holding said primary articles in a vertical stack, a stop-flange at the bottom of said tube for holding said stack, a feed arm mounted for transverse movement relative to the tube, and an operable drive arm connected to said feed arm for imparting transverse movement to the latter such that operation of said drive arm causes said feed arm to disengage a primary article from said stop-flange and effect the feeding of the disengaged article to the conveyor, said drive arm being operated by said conveyor drive means in synchronism with driving said conveyor at said first speed.

14. Apparatus according to claim 13 wherein said supplemental feed mechanism includes a vertical supply tube for holding said supplemental articles in a stack, and a stop-flange on the bottom of said supplemental tube for holding said supplemental articles, a supplemental feed arm mounted for transverse movement relative to said supplemental tube, and an operable drive arm connected to said supplemental feed arm for imparting transverse movement to the latter such that operation of said drive arm causes said feed arm to disengage a supplemental article from said stop-flange and effect the feeding of this engaged article to the conveyor, said supplemental drive arm being operated by said conveyor drive means in synchronism with driving said conveyor at said second speed.

* * * * *